Feb. 13, 1973   D. B. COFER   3,716,423
HOT-FORMED COPPER-BASE PRODUCT
Filed Feb. 2, 1970   6 Sheets-Sheet 1

INVENTOR
Daniel B. Cofer
BY
Jones & Thomas
ATTORNEYS

Feb. 13, 1973　　　D. B. COFER　　　3,716,423
HOT-FORMED COPPER-BASE PRODUCT

Filed Feb. 2, 1970　　　6 Sheets-Sheet 2

INVENTOR
Daniel B. Cofer
BY
Jones & Thomas
ATTORNEYS

Feb. 13, 1973  D. B. COFER  3,716,423
HOT-FORMED COPPER-BASE PRODUCT
Filed Feb. 2, 1970  6 Sheets-Sheet 3

INVENTOR
Daniel B. Cofer

BY: Jones & Thomas
ATTORNEYS

Feb. 13, 1973　　　　D. B. COFER　　　　3,716,423
HOT-FORMED COPPER-BASE PRODUCT

Filed Feb. 2, 1970　　　　　　　　　　　　6 Sheets-Sheet 4

INVENTOR
Daniel B. Cofer

BY: Jones & Thomas
ATTORNEYS

INVENTOR
Daniel B. Cofer

BY:

Jones & Thomas
ATTORNEYS

Feb. 13, 1973   D. B. COFER   3,716,423
HOT-FORMED COPPER-BASE PRODUCT
Filed Feb. 2, 1970   6 Sheets-Sheet 6
Fig. 22
Fig. 23
INVENTOR.
Daniel B. Cofer
BY: Jones & Thomas
ATTORNEYS United States Patent Office 3,716,423
Patented Feb. 13, 1973

3,716,423
HOT-FORMED COPPER-BASE PRODUCT
Daniel B. Cofer, Carrollton, Ga., assignor to Southwire Company, Carrollton, Ga.
Continuation-in-part of application Ser. No. 633,670, Apr. 18, 1967, which is a continuation-in-part of application Ser. No. 498,773, Oct. 20, 1965. This application is also a continuation-in-part of application Ser. No. 816,127, Apr. 14, 1969, which is a continuation of application Ser. No. 613,245, Feb. 1, 1967, which in turn is a division of application Ser. No. 390,666, Aug. 19, 1964, now Patent No. 3,317,994. This application Feb. 2, 1970, Ser. No. 7,779
Int. Cl. C22f 1/08
U.S. Cl. 148—32
1 Claim

ABSTRACT OF THE DISCLOSURE

A hot-formed copper-base product in which the copper-base metal has copper oxide inclusions which are substantially uniformly dispersed and has a substantially uniform fine grain structure. In the form of a rod of tough pitch copper, the hot-formed copper-base product is superior to prior art hot-formed copper-base products for drawing into wire and for other uses. The hot-formed copper-base product is produced in the form of a rod of tough pitch copper by substantially completely solidifying a molten copper-base metal to obtain a cast metal and by hot-forming the cast metal into rod, the hot-forming being initiated while the cast metal is in substantially that condition in which it solidified and being of sufficient degree to substantially completely destroy the columnar dendritic structure of the cast metal.

CROSS-REFERENCES TO RELATED APPLICATIONS

This application is a continuation-in-part of a copending United States patent application entitled "Hot-Formed Copper-Base Product" which was filed on Apr. 18, 1967, and assigned Ser. No. 633,670 now abandoned and which is a continuation-in-part of a now abandoned United States patent application entitled "Method of Producing Hot-Formed Copper-Base Products from Molten Metal" that was filed on Oct. 20, 1965, and assigned Ser. No. 498,773. This application is also a continuation-in-part of a co-pending United States patent application entitled "Apparatus for Producing a Hot-Formed Product" which was filed on Apr. 14, 1969, and assigned Ser. No. 816,127 and which is a continuation of a now abandoned U.S. patent application entitled "Apparatus for Producing a Hot-Formed Product" that was filed on Feb. 1, 1967 and assigned Ser. No. 613,245 and that was a division of a United States patent application entitled "Apparatus For and Method of Conditioning Metal For Rolling" when filed on Aug. 19, 1964 and assigned Ser. No. 390,666, now U.S. Pat. No. 3,317,994.

BACKGROUND OF THE INVENTION (1) Field of the invention

This invention relates to hot-formed copper-base products, and more particularly to a hot-formed copper-base product in which the copper-base metal has copper oxide inclusions which are substantially uniformly dispersed and has a substantially uniform fine grain structure.

(2) Description of the prior art

In a hot-formed copper-base product it is highly desirable that any copper oxide inclusions be uniformly dispersed throughout the product. This is because concentrations of copper oxide inclusions in a hot-formed copper-base product reduce the quality and usefulness of the product. For example, concentrations of copper oxide inclusions are highly undesirable at or adjacent the surface of a rod which is to be drawn into copper wire since these concentrations will result in the copper wire having portions of its length in which copper oxide inclusions are heavily concentrated. Concentrations of copper oxide inclusions in copper wire cause the copper wire to have poor mechanical strength during its drawing and in use. Moreover, they frequently cause the copper wire to have poor surface properties, such as surface brittleness, which limit the usefulness of the copper wire in applications such as film insulated wire coils.

Hot-formed copper-base products having acceptable concentrations of copper oxide inclusions and which are otherwise suitable for drawing into copper wire and for other similar uses have been obtained in the prior art only with considerable difficulty. This is because most of the cast metal used in the prior art is characterized by a set surface in which concentrations of copper oxide inclusions occur. These concentrations of copper oxide inclusions become a major characteristic of a prior art hot-formed copper-base product in spite of the hot-forming of the cast metal unless they are removed by shaving the cast metal prior to hot-forming or by scalping the hot-formed copper-base product subsequent to hot-forming. However, shaving or scalping frequently does not completely remove this source of concentrations of copper oxide inclusions, results in metal waste, and is time consuming and expensive.

Moreover, shaving or scalping is directed only to this source of concentrations of copper oxide inclusions even though there are other sources of concentrations of copper oxide inclusions in the prior art. For example, most prior art hot-formed copper-base products are hot-formed from cast metal which is reheated from ambient temperature immediately prior to hot-forming. The reheating of a cast metal prior to hot-forming generally causes the formation of copper oxide on the surface of the cast metal, and during hot-forming this copper oxide is forced into a prior art hot-formed copper-base product adjacent to its surface to cause concentrations of copper oxide inclusions which are not removed by shaving or scalping. In addition, the reheating of a cast metal prior to hot-forming causes concentrations or globules of copper oxide to form within the cast metal which are also not removed by shaving or scalping.

SUMMARY OF THE INVENTION

The hot-formed copper-base product disclosed herein completely overcomes these difficulties encountered in the prior art in that it is a hot-formed copper-base product having only substantially uniformly dispersed copper oxide inclusions. In addition, it is a hot-formed copper-base product having a substantially uniform fine grain structure. The absence of concentrations of copper oxide inclusions makes the resulting hot-formed copper-base product ideally suited for subsequent drawing into copper wire. Moreover, the substantially uniform dispersal of copper oxide inclusions and the substantially uniform fine grain structure provide a hot-formed copper-base product which may include a greater amount of copper oxide inclusions than prior art hot-formed copper-base products without sacrificing the mechanical strength of a copper wire drawn from it.

The hot-formed copper-base product disclosed herein is produced by pouring molten copper into an elongated mold which substantially encloses the molten copper, cooling the molten copper in a substantially uniform manner about the longitudinal axis of the mold until the molten copper solidifies into cast metal, and hot-forming the cast metal with the cast metal being in substantially that condition in which it solidified and with the hot-forming being of sufficient degree to substantially completely destroy the columnar dendritic structure of the cast metal.

It will be noted that the producing of the hot-formed copper-base product disclosed herein does not require the reheating of a cast metal prior to hot-forming. Thus, the hot-formed copper-base product disclosed herein avoids that forming of globules of copper oxide which occurs in the prior art during the reheating of a cast metal from ambient temperature and it also completely eliminates the personnel and expensive furnaces required to accomplish this heating step in the producing of prior art hot-formed copper-base products. Moreover, the producing of the hot-formed copper-base product disclosed herein causes no set surface or concentrations of copper oxide within the cast metal and requires no shaving or scalping operations to remove concentrations of copper oxide inclusions.

BRIEF DESCRIPTION OF THE DRAWING

These and other features and advantages of the invention will be more clearly understood from the following detailed description and the accompanying drawing in which like characters of reference designate corresponding parts throughout and in which:

FIG. 22 shows the successive transverse cross-sectional shapes of the cast metal shown in FIG. 4 as the cast metal is hot-formed in the rolling mill shown in FIG. 7; and FIG. 23 shows the successive transverse cross-sectional shapes of the cast metal shown in FIG. 4 as the cast metal is hot-formed in the rolling mill shown in FIG. 1.

DESCRIPTION OF AN EMBODIMENT

These figures and the following detailed description disclose a specific embodiment of the invention. However, it will be understood that the invention is not limited to the details disclosed since it may be embodied in other equivalent forms.

The invention is disclosed herein in terms of a tough pitch copper rod 20 for subsequent drawing into tough pitch copper wire. This is because the invention is ideally suited to such a hot-formed copper-base product. However, once the invention is understood, it will be readily apparent to those skilled in the art that the inventive concept encompasses many different hot-formed copper-base products which are in addition to a tough pitch copper rod and which have many uses other than for subsequent drawing into tough pitch copper wire.

Figure 1:
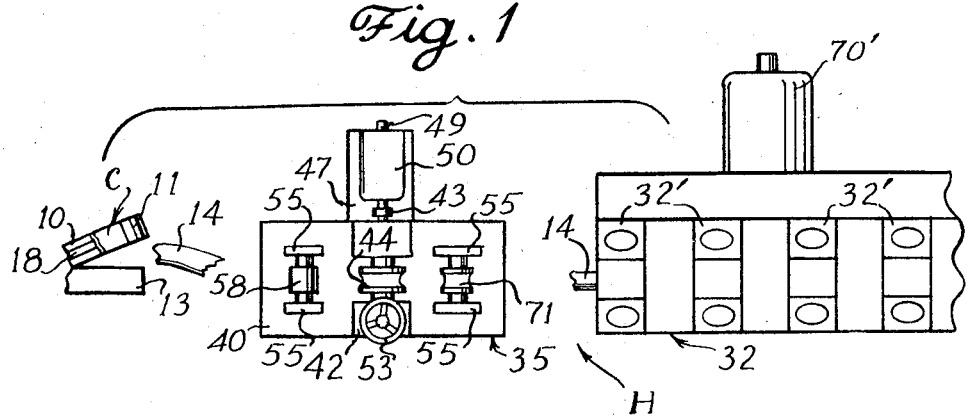
FIG. 1 is a top plan view of apparatus suitable to produce the hot-formed copper-base product disclosed herein.
Figure 7:
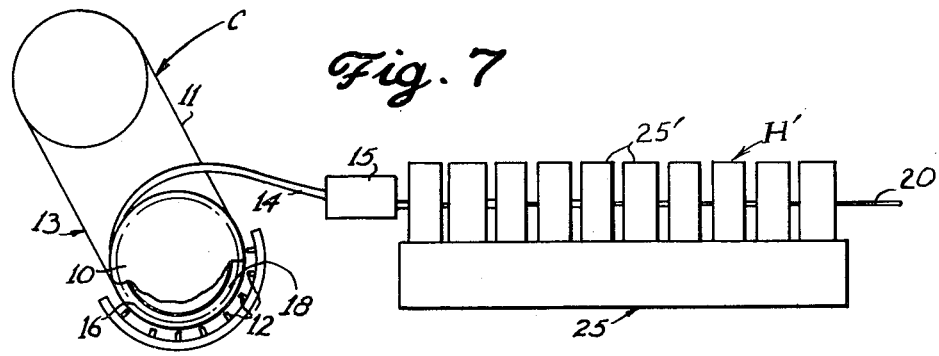
FIG. 7 is a schematic representation of alternate apparatus suitable to produce the hot-formed copper-base product disclosed herein.

Moreover, it will also be understood that although apparatus is shown in FIGS. 1 and 7 for producing the hot-formed copper-base product which is the invention disclosed herein, other arrangements of apparatus are equally adapted to producing this hot-formed copper-base product. It is for this reason that apparatus shown in FIGS. 1 and 7 is not described below in greater detail and that it is referred to herein only insofar as is necessary to disclose fully the invention.

The apparatus for producing a hot-formed copper-base product embodying the invention includes a casting means C and a hot-forming means H or H'. In the apparatus of both FIG. 1 and FIG. 7, the casting means C is a continuous casting machine 13. In FIG. 7, the hot-forming means H' is shown as a rolling mill 25 and in FIG. 1, the hot-forming means is shown as including an initial roll stand 35 in tandem with a rolling mill 32. In the apparatus of FIG. 1, in the apparatus of FIG. 7, and in other apparatus suitable to produce the hot-formed copper-base product disclosed herein, the hot-forming means H or H' serves as a means for hot-forming a cast metal 14 into a tough pitch copper rod 20 or other hot-formed copper-base product in such a manner that the columnar dendritic structure of the cast metal 14 is destroyed. This will be better understood after the following discussion of tough pitch copper rod 20 as an embodiment of the invention and of the use of the apparatus shown in FIGS. 1 and 7 in producing it.

In the production of tough pitch copper rod 20 for subsequent drawing into tough pitch copper wire using the apparatus of FIG. 1 or FIG. 7, molten copper having a chemical analysis generally corresponding to that of molten copper conventionally used in the production of such rod is poured into an elongated mold such as that formed by the casting wheel 10 and by the band 11 of the continuous casting machine 13 shown in FIGS. 1 and 7. In the elongated mold provided by the peripheral groove 18 in the casting wheel 10, the molten metal is cooled in a substantially uniform manner about the longitudinal axis 16 of the mold. In the apparatus of FIG. 1 or FIG. 7, this cooling is aided by the application of coolant to the mold which may be accomplished in conventional manner by coolant in channels (not shown) within the casting wheel 10 and by spraying coolant on the band 11 from nozzles 12 as shown in FIG. 7.

When the molten copper has solidified into the cast metal 14 in the mold, it is removed from the mold while its temperature is still within the range of hot-forming temperatures for copper. With a continuous casting machine 13 such as that shown in FIGS. 1 and 7, this is accomplished by simply rotating the casting wheel 10 at that rotational speed which causes the cast metal 14 to be ejected in conventional manner from the mold while the cast metal 14 is still at a temperature within the range of hot-forming temperatures for copper.

It will be understood that with a mold arrangement such as that provided by the continuous casting machine 13, the molten metal is solidified into the cast metal 14 as the molten metal moves along the curved longitudinal axis 16 of the mold and that as the molten metal solidifies, it is completely enclosed by the casting wheel 10, the band 11, cast metal 14, and other molten metal. It will also be understood that with a mold arrangement such as this, there is no set surface or surface concentration of copper oxide inclusions in the cast metal 14 regardless of the rate at which it is cooled in the mold.

Subsequent to the removal of the cast metal 14 from the mold, the cast metal 14 is hot-formed by a hot-forming means such as the hot-forming means H' provided by the rolling mill 25 having a plurality of roll stands 25' as shown in FIG. 7 or the hot-forming means H provided by the initial roll stand 35 in tandem with the rolling mill 32 having a plurality of roll stands 32' driven by a motor 70 as shown in FIG. 1. Upon initiation of hot-forming, the cast metal 14 is in substantially that condition in which it solidified and its temperature is still within the range of hot-forming temperatures for copper. The initiation of the hot-forming of the cast metal 14 while the cast metal 14 is in its as cast condition can be accomplished by placing a mold such as that provided by the continuous casting machine 13 sufficiently close to a hot-forming means H or H' for the cast metal 14 to be fed to the hot-forming means H or H' with no substantial reduction in the temperature of the cast metal 14 between the continuous casting machine 13 and the hot-forming means H or H' or by providing means, such as the furnace 15 shown in FIG. 7, for retarding the loss of heat from the cast metal 14 as it passes between the continuous casting machine 13 and the hot-forming means H or H'.

The furnace 15 or other conventional means for generating heat may also be used to adjust the temperature of the cast metal 14 if a particular hot-forming temperature is desired for the cast metal 14 upon initiation of hot-forming. Any such particular hot-forming temperature and the range of hot-forming temperatures for copper within which the cast metal 14 is removed from the mold and within which hot-forming is initiated are conventional and will be understood by those skilled in the art.

The importance of such a hot-forming means H or H' is best shown by a consideration of the hot-forming of the cast metal 14 by the initial roll stand 35 in the hot-forming means H which is shown in FIG. 1. However, it should be understood when considering the hot-forming of the cast metal 14 by the initial roll stand 35 that in spite of the difference between the hot-forming means H and the hot-forming means H' which results from the initial roll stand 35 serving alone in the hot-forming means H to substantially destroy the columnar dendritic structure of the case metal 14, the hot-forming means H' in the apparatus of FIG. 7 also serves to substantially destroy the columnar dendritic structure of the cast metal 14.

Figure 2:
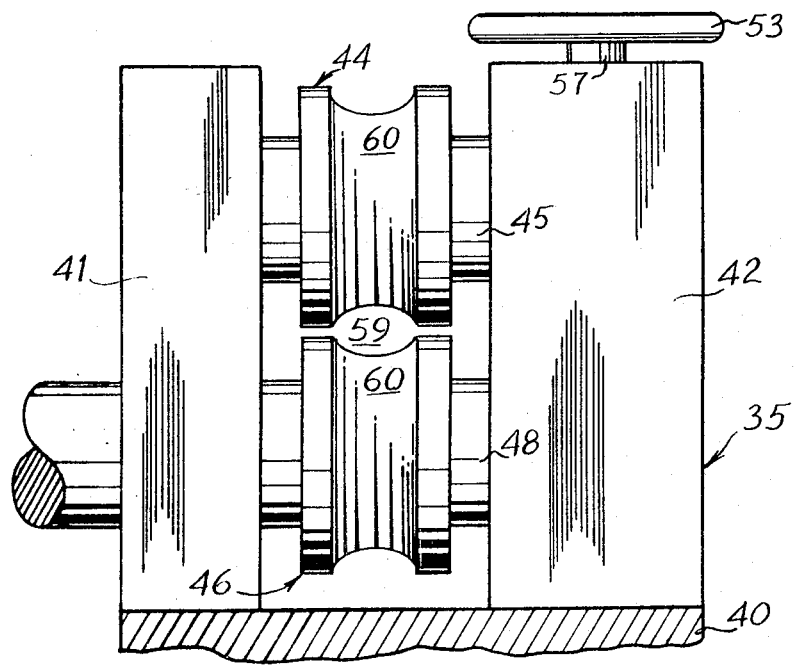
FIG. 2 is an enlarged elevational view of the initial roll stand in the apparatus shown in FIG. 1.

Referring to FIG. 1 and to FIG. 2 which shows the initial roll stand 35 of the apparatus shown in FIG. 1 in more detail, it is seen that the initial roll stand 35 comprises generally a base 40, a left upright 41, a right upright 42, an upper roll 44 mounted on a shaft 45, and a lower roll 46 mounted on a shaft 48. The rolls 44 and 46 are rotatably positioned parallel to each other between the left upright 41 and the right upright 42 by the shafts 45 and 48, and the shaft 48 extends through the left upright 41 to a clutch 43 which serves to join the shaft 48 in known manner to the drive shaft 49 of a motor 50 mounted on a platform 47 adjacent the left upright 41.

The motor 50 drives the lower roll 46 through the shaft 48 and the shaft 45 is joined within the right upright 42 to the shaft 48 so that as the shaft 48 rotates in a particular rotational direction, the shaft 45 rotates in the opposite rotational direction and at the same rotational speed as the shaft 48. Thus, the motor 50 serves to tate the rolls 44 and 46 in opposite directions at substantially identical rotational speeds.

It will be understood that the spacing between the rolls 44 and 46 is adjustable by rotation of a wheel 53 at the upper end of a shaft 57 extending from within the right upright 42. It will also be understood that when the cast metal 14 is received from the continuous casting machine 13, the rolls 44 and 46 reduce the cross-sectional area of the cast metal 14 and force the cast metal 14 to the right as seen in FIG. 1 to be received by the rolling mill 32.

Positioned above the base 40 in the path of the cast metal 14 as it moves through the rolls 44 and 46 are a pair of guide rolls 58 and 71 rotatably carried by supports 55 attached to the base 40. The guide roll 58 is shaped to receive and support the cast metal 14 at it approaches the rolls 44 and 46 and the guide roll 71 is shaped to receive the cast metal 14 as it exits the rolls 44 and 46 to be fed to the rolling mill 32.

As is best seen in FIG. 2, each of the rolls 44 and 46 has a groove 60 having the shape of a semi-ellipse. Together the grooves 60 define an elliptical rolling channel 59 in which the cast metal 14 is compressed as it passes between the rolls 44 and 46. The shape of this rolling channel 59 serves to prevent excessive spreading of the cast metal 14 as it is compressed by the rolls 44 and 46.

Figure 3:
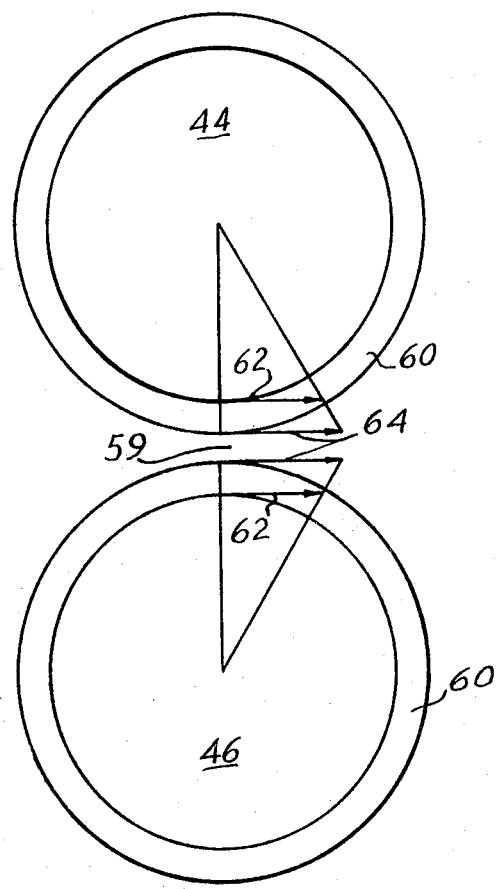
FIG. 3 is a diagrammatic representation of the initial roll stand in the apparatus shown in FIG. 1.

Moreover, as is best shown in FIG. 3, the rolling channel 59 provides linear speed relationships in the cast metal 14 as the cast metal 14 passes between the rolls 44 and 46 which physically prevent cracking and splitting of the cast metal 14 as the result of abrupt changes in velocity within the cast metal 14 as it is being rolled by the rolls 44 and 46. This is because the elliptical shape of the rolling channel 59 causes the rolls 44 and 46 to have different linear tangential velocities as they engage different portions of the cast metal 14. As indicated by the arrows 62 and 64 in FIG. 3, that portion of each groove 60 nearest the axis of rotation of a roll 44 or 46 has the smallest tangential velocity and that portion of each groove 60 at its outer edge has the greatest tangential velocity.

It will be understood that those portions of each groove 60 between that portion indicated by an arrow 62 as having the smallest tangential velocity and that portion indicated by an arrow 64 as having the greatest tangential velocity will progressively increase in tangential velocity from the smallest tangential velocity to the greatest tangential velocity. It will also be understood that this velocity relationship within the rolling channel 59 tends to force the outer edges of the cast metal 14 inwardly toward the center of the rolling channel 59 when the cast metal 14 is fed between the rolls 44 and 46. From the foregoing, it will be seen that the initial roll stand 35 provides a means for hot-forming the cast metal 14 while at the same time physically preventing cracking or splitting of the cast metal 14 even though the metal in the cast metal 14 has not been homogenized.

Figure 4:
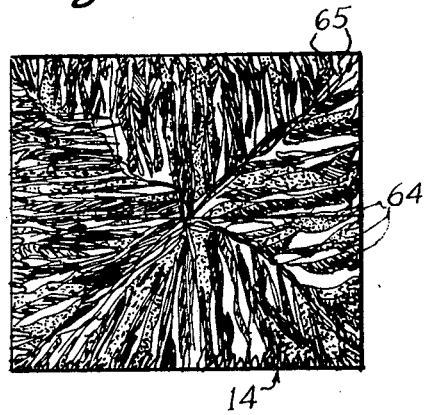
FIG. 4 is a cross-sectional representation of the cast metal from a casting means prior to the cast metal passing through the initial roll stand shown in FIG. 2 or the rolling mill shown in FIG. 7.
Figure 6:
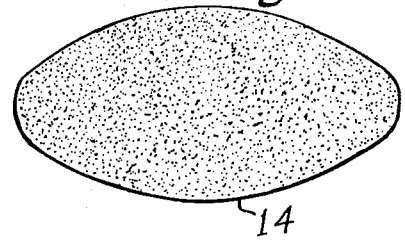
FIG. 6 is a cross-sectional representation of the cast metal shown in FIG. 4 after the cast metal has passed through the initial roll stand shown in FIG. 2.

In the initial roll stand 35 in the hot-forming means H, the cross-sectional shape of the cast metal 14 after passing between the rolls 44 and 46 is changed from a cross-sectional shape similar to that shown in FIG. 4 to one similar to that shown in FIG. 6 without cracking or splitting occurring and by an amount which is sufficiently great to destroy the dendritic structure of the cast metal 14. In the hot-forming means H' shown in FIG. 7, the cross-sectional shape of the cast metal 14 is also changed so as to destroy the dendritic structure within the cast metal 14 even though the hot-forming means H' will not prevent the cracking or splitting of the cast metal 14 to the same degree as the hot-forming means H unless the reductions in the initial roll stands 25' of the rolling mill 25 are such as to achieve the same initial destruction of the columnar dendritic structure of the cast metal 14 as that provided by the initial roll stand 35 in the hot-forming means H.

The manner in which the hot-forming means H' changes the cross-sectional shape of the cast metal 14 is shown in FIG. 22 from which it will be seen that the plurality of roll stands 25' in the rolling mill 25 hot-form the cast metal 14 into a plurality of successive transverse cross-sectional shapes which are of decreasing cross-sectional area and which are alternately substantially flattened and substantially round. It will be understood from U.S. Pat. No. 3,315,349 issued on Apr. 25, 1967 to D. B. Cofer that the hot-forming of the cast metal 14 into the plurality of successive transverse cross-sectional shapes shown in FIG. 22 results in substantial movement of the cast metal 14 not only along an axis of elongation but also in directions transverse to the axis of elongation so as to hot-form the cast metal 14 into a rod 20 having a substantially uniform fine grain structure. Moreover, it will also be understood from FIG. 22 that the reduction in the cross-sectional area of cast metal 14 in the hot-forming means H' is greater than that provided by the initial roll stand 35 in FIG. 1.

Although the rolling mill 32 in the hot-forming means H could be selected to hot-form the cast metal 14 into substantially the same plurality of successive transverse cross-sectional shapes shown in FIG. 22 as are provided by the rolling mill 25, the rolling mill 32 may also be selected to hot-form the cast metal 14 into the plurality of successive transverse cross-sectional shapes which are shown in FIG. 23. These transverse cross-sectional shapes are of decreasing cross-sectional area and are alternately substantially triangular and substantially round and as a result, the rolling mill 32 does not impart substantial motion to the cast metal 14 in directions transverse to its axis of elongation in the same manner as the rolling mill 25. However, the initial roll stand 35 insures that dendritic structure of the cast metal 14 is destroyed by the hot-forming means H and in combination with the rolling mill 32, the initial roll strand 35 insures that the hot-forming means H provides a fine grain structure in the rod 20 which is almost as uniform as that provided by the hot-forming means H'.

Figure 5:
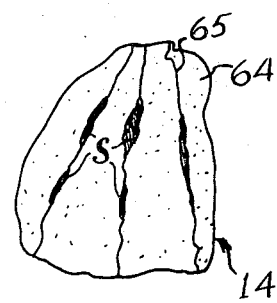
FIG. 5 is an enlarged view of a portion of the representation of the cast metal in FIG. 4.

As to the destruction of the columnar dendritic structure of the cast metal 14 by either the hot-forming means H or the hot-forming means H', it has been found that simply a change in the cross-sectional area of cast metal 14 as shown by FIGS. 4 and 6 or by FIG. 22 of at least approximately 36 percent will result in the destruction of the dendritic structure of a copper-base cast metal 14. The result of such a reduction in the cross-sectional area of the cast metal 14 by a hot-forming means H or H' is represented by the result of such a reduction in the initial roll stand 35 as shown by a comparison of FIG. 4 and FIG. 5 with FIG. 6. In FIGS. 4 and 5, the cast metal 14 is represented as having columnar dendrites 64 with segregated alloying and other elements and compounds S trapped at the grain boundaries 65 of the dendrites 64.

FIG. 6 represents the cast metal 14 represented in FIGS. 4 and 5 after the dendritic structure of the cast metal 14 has been substantially completely destroyed. From FIG. 6, it will be seen that the destruction of columnar dendritic structure of the cast metal 14 eliminates the grain boundaries 65 at which the alloying and other elements and compounds indicated by the letter S in FIG. 5 were segregated. Thus, the destruction of the columnar dendritic structure of the cast metal 14 not only disperses copper oxide at the grain boundaries 65 but also alloying and other elements and compounds.

It will be understood that in addition to being hot-formed in the manner described above, a rod 20 embodying the invention disclosed herein is produced directly from molten metal. As a result, the invention completely eliminates the reheating of a cast metal such as the cast metal 14 or wire bars, the shaving, the scalping and the other similar operations characteristic of the prior art.

More importantly, it will be understood that as a result of the method by which it is produced, a rod 20 or other hot-formed copper-base product embodying the invention disclosed herein has a substantially uniform fine grain structure and substantially uniformly dispersed copper oxide inclusions. Finally, it will be understood that no product such as this which could be produced in a practical manner existed in the prior art.

That the invention disclosed herein is a hot-formed copper-base product having a more uniform fine grain size and more uniformly dispersed copper oxide inclusions than prior art products is clearly shown by FIGS. 8–19. These FIGS. 8–19 are photomicrographs of the rod 20 embodying the invention disclosed herein, a first prior art rod 21, and a second prior art rod 22. The photomicrographs of FIGS. 8–13 were obtained by cutting the rod 20, the rod 21 and the rod 22 transversely of their longitudinal centerlines to obtain transverse surfaces and the photomicrographs of FIGS. 14–19 were obtained by cutting sections of the rod 20, the rod 21 and the rod 22 parallel to their longitudinal centerlines to obtain longitudinal surfaces. Each transverse surface and longitudinal surface shown in FIGS. 8–19 was polished and etched with ammonium hydroxide-hydrogen peroxide etchant in conventional manner and the photomicrographs shown in FIGS. 8–19 were then made in a conventional metallograph using a yellow-green filter and a magnification of 200×.

The rod 21 and the rod 22 both had a chemical analysis similar to that of the rod 20. However, the rod 21 was produced from conventional wire bar by heating the wire bar in an oil fired furnace for approximately two hours to attain a hot-forming temperature and by hot-forming the wire bar in conventional manner in a conventional looping mill. Similarly, the rod 22 was produced from conventional wire bar by heating the wire bar in an induction furnace until it reached a hot-forming temperature and by hot-forming the wire bar in conventional manner in a conventional Loewy Mill. Thus, the rod 21 and the rod 22 are both representative of prior art hot-formed copper-base products and only the rod 20 is representative of the invention disclosed herein.

Figure 8:
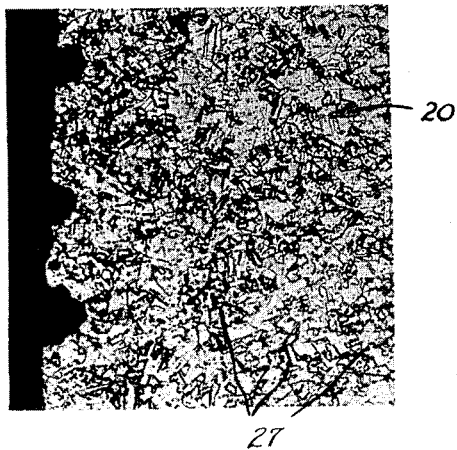
FIG. 8 is a photomicrograph of a portion of an etched transverse surface of a rod embodying the invention disclosed herein, the portion being adjacent the surface of the rod.
Figure 9:
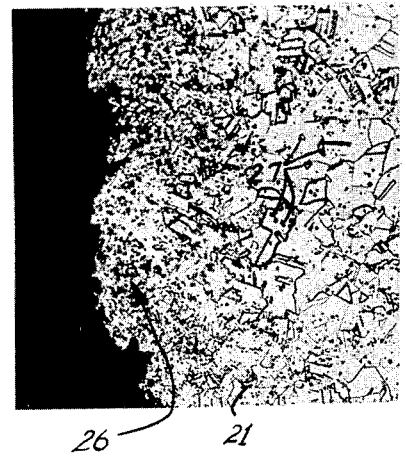
FIG. 9 is a photomicrograph of a portion of an etched transverse surface of a first prior art rod, the portion being adjacent the surface of the rod.
Figure 10:
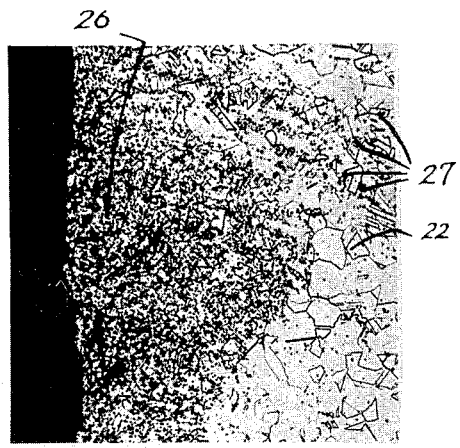
FIG. 10 is a photomicrograph of a portion of an etched transverse surface of a second prior art rod, the portion being adjacent the surface of the rod.
Figure 11:
FIG. 11 is a photomicrograph of a second portion of the etched transverse surface of FIG. 8, the second portion being substantially in the center of the rod embodying the invention disclosed herein.
Figure 12:
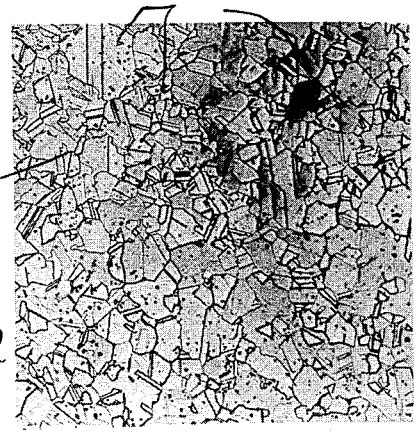
FIG. 12 is a photomicrograph of a second portion of the etched transverse surface of FIG. 9, the second portion being substantially in the center of the first prior art rod.
Figure 13:
FIG. 13 is a photomicrograph of a second portion of the etched transverse surface of FIG. 10, the second portion being substantially in the center of the second prior art rod.

FIGS. 8–10 are photomicrographs of the transverse surfaces of the rod 20, the rod 21 and the rod 22 respectively and show a portion of each of these transverse surfaces adjacent the surface of the rod 20, 21 or 22. FIGS. 11–13 correspond to FIGS. 8–10 respectively and show a second portion of each transverse surface substantially at the center of the rod 20, 21 or 22.

Figure 14:
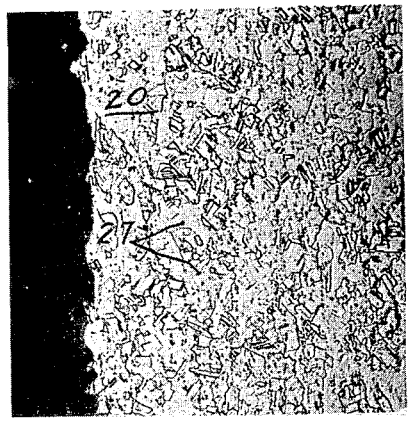
FIG. 14 is a photomicrograph of a portion of an etched longitudinal surface of the rod of FIG. 8, the portion being adjacent the surface of the rod embodying the invention disclosed herein.
Figure 15:
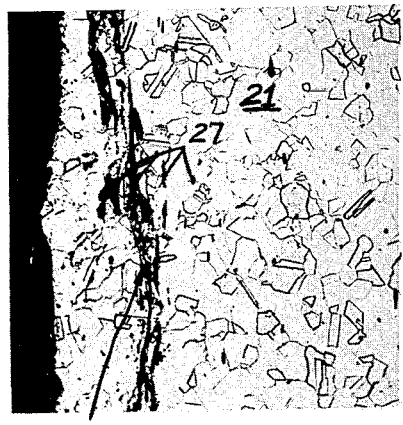
FIG. 15 is a photomicrograph of a portion of an etched longitudinal surface of the rod of FIG. 9, the portion being adjacent the surface of the first prior art rod.
Figure 16:
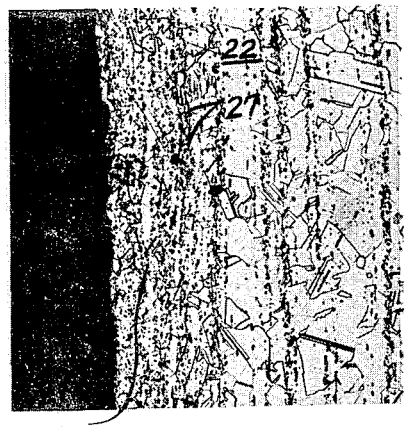
FIG. 16 is a photomicrograph of a portion of an etched longitudinal surface of the rod of FIG. 10, the portion being adjacent the surface of the second prior art rod.
Figure 17:
FIG. 17 is a photomicrograph of a second portion of the etched longitudinal surface of FIG. 14, the second portion being substantially at the center of the rod embodying the invention disclosed herein.
Figure 18:
FIG. 18 is a photomicrograph of a second portion of the etched longitudinal surface of FIG. 15, the second portion being substantially at the center of the first prior art rod.
Figure 19:
FIG. 19 is a photomicrograph of a second portion of the etched longitudinal surface of FIG. 16, the second portion being substantially at the center of the second prior art rod.

Similarly, FIGS. 14–16 are photomicrographs of the longitudinal surfaces of the rod 20, the rod 21 and the rod 22 respectively and show a portion of each of these longitudinal surfaces adjacent the surface of the rod 20, 21 or 22. FIGS. 17–19 correspond to FIGS. 14–16 respectively and show a second portion of each longitudinal surface substantially at the center of the rod 20, 21 or 22.

Thus FIGS. 8 and 14 are representative of the rod 20 adjacent its surface and FIGS. 11 and 17 are representative of the rod 20 at its center. FIGS. 9 and 15 are representative of the rod 21 adjacent its surface and FIGS. 12 and 18 are representative of the rod 21 at its center. Similarly, FIGS. 10 and 16 are representative of the rod 22 adjacent its surface and FIGS. 13 and 19 are representative of the rod 22 at its center.

When FIGS. 8 and 14 for the rod 20 are compared with FIGS. 9 and 15 for the rod 21 and FIGS. 10 and 16 for the rod 22, it will be readily seen that the rod 21 and the rod 22 are both characterized by concentrations 26 of copper oxide inclusions 27 and that the rod 20 has only uniformly dispersed copper oxide inclusions 27. The concentrations 26 of copper oxide inclusions 27 in the rods 21 and 22 are in those areas of the photomicrographs which correspond to the transverse surfaces of the rods 21 and 22 nearest their respective edges and are partly attributable to wire bar set surfaces and partly attributable to copper oxide formed during heating to hot-forming temperature being rolled into the rod 21 or 22 during hot-forming.

Figure 20:
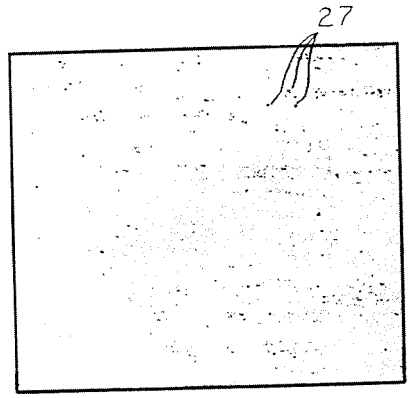
FIG. 20 is a photomicrograph of a portion of an unetched longitudinal surface of the rod of FIG. 8, the portion being representative of the unetched longitudinal surface of the rod embodying the invention disclosed herein.
Figure 21:
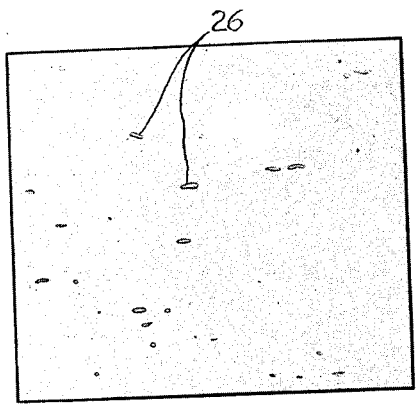
FIG. 21 is a photomicrograph of a portion of an unetched longitudinal surface of the rod of FIG. 9, the portion being representative of the unetched longitudinal surface of the first prior art rod.

When FIGS. 11 and 17 for the rod 20 are compared with FIGS. 12 and 18 for the rod 21 and FIGS. 13 and 19 for the rod 22, it appears that at the centers of all the rods 20, 21 and 22, the copper oxide inclusions 27 are uniformly dispersed. However, FIGS. 20 and 21 are also photomicrographs of portions of longitudinal surfaces of the rods 20 and 21 respectively which are representative of these longitudinal surfaces at the centers of the rods 20 and 21. Unlike the photomicrographs in FIGS. 8–19, the photomicrographs in FIGS. 20 and 21 were made in a conventional metallograph of conventionally polished but unetched surfaces at a magnification of 320× and they clearly show globules or concentrations 26 of copper oxide inclusions 27 in the rod 21 which are absent from the rod 20. Since the globules or concentrations 26 of copper oxide inclusions 27 shown in FIG. 21 are the result of reheating a cast metal from ambient temperature prior to hot-forming and since both the rod 21 and the rod 22 were hot-formed from reheated cast metal, FIG. 21 is representative of both rod 21 and rod 22.

Thus, it will now be understood that the rod 20 has only uniformly dispersed copper oxide inclusions 27 and that the prior art rod 21 and the prior art rod 22 have large concentrations 26 of copper oxide inclusions 27 adjacent their surfaces and smaller concentrations or globules throughout so that the dispersal of copper oxide inclusions 27 in these rods 21 and 22 is not uniform. Moreover, it will be noted from FIGS. 8, 11, 14 and 17 for the rod 20, FIGS. 9, 12, 15 and 18 for the rod 21, and FIGS. 10, 13, 16 and 19 for the rod 22 that the rod 20 has generally uniform copper grains of generally smaller size than the rods 21 and 22.

From the foregoing, it will now be apparent that the hot-formed copper-base product disclosed herein is a product having a substantially uniform fine grain structure and a uniform dispersal of copper oxide inclusions which are superior to prior art hot-formed copper-base products. In particular and by way of example only, it will be understood that the invention provides a rod 20 for drawing into copper wire which has a uniform dispersal of copper oxide inclusions and a uniform fine grain structure not obtainable in the prior art.

It will also be understood that many variations may be made in the embodiment chosen herein for the purposes of illustrating the present invention without departing from the scope thereof as defined by the appended claims.

I claim:

1. A rod for drawing into wire, said rod being of tough pitch copper characterized by substantially uniformly dispersed copper oxide inclusions, a substantially uniform fine grain structure, and the absence of columnar dendritic structure, said rod being produced from a molten metal by a method including:
    substantially completely solidifying said molten metal in a substantially closed mold to obtain cast metal; and
    hot-forming said cast metal into said rod, said hot-forming being initiated while said cast metal is in substantially that condition in which it solidified and being of sufficient degree to destroy substantially all of the columnar dendritic structure of said cast metal.

References Cited

UNITED STATES PATENTS

| | | | |
|---|---|---|---|
| 362,688 | 5/1887 | Washburn et al. | 164—277 |
| 3,209,452 | 10/1965 | Schneckenburger | 29—528 |
| 3,279,000 | 10/1966 | Cofer et al. | 164—277 |
| 3,349,471 | 10/1967 | Bell et al. | 29—528 |
| 3,315,349 | 4/1967 | Cofer | 29—528 |

OTHER REFERENCES

"Continuous Casting Technology: A Preliminary Evaluation" Report # MET–68–S3, McCloskey et al., November 1968, Mellon Institute.

Modern Metals, Russel, April 1964, pp. 54, 56 and 58.

Wire, October 1961, pp. 1349–51, 1354–57, 1360, 1365–1369, 1440 and 1441.

CHARLES N. LOVELL, Primary Examiner

U.S. Cl. X.R.

29—193; 75—153